UNITED STATES PATENT OFFICE.

JONATHAN GRIFFIN, OF STANFORD, NEW YORK.

IMPROVEMENT IN BURNING-FLUIDS.

Specification forming part of Letters Patent No. 23,167, dated March 8, 1859.

*To all whom it may concern:*

Be it known that I, JONATHAN GRIFFIN, of Stanford, Delaware county, and State of New York, have invented certain new and useful Improvements in the Means of Producing Light and Heat; and I do hereby declare the following to be a full, clear, and exact description thereof.

In order to enable others reasonably skilled in the art to make and use my invention, I will proceed to describe the same.

I mix thoroughly together about three parts, by measurement, of crude coal-naphtha, five parts of coal-tar, two parts of gum-turpentine, two parts of common wood-tar, one part of refined rosin-oil, and about three parts of highly-rectified rosin-naphtha. I then place this mixture into a vessel containing about eight parts of water heated to the boiling heat, about three-fourths of a pound of quick lime to each gallon of water, care being taken to place the mixture in the water as soon as the lime has fully commenced slaking and in such manner as to prevent the mixture falling down upon the lime at the bottom of the vessel. I then close the vessel sufficiently tight to prevent the escape of such gases as may be disengaged from the mixture. After the slaking of the lime has ceased I thoroughly agitate the contents of the vessel at frequent intervals—say every four hours—for a period of, say, about twenty-four hours, after which I filter the mixture, and thus form a substance which, for distinction, I call "fluid A." The substance so produced can be used with advantage to produce light and heat; but when used a residuum will be left. To prevent this liability or result I distill the compound A under a temperature varying from about 65° to about 200° according to the degree of purity of which I wish to have the distillate, the lowest temperature securing the greatest purity. I find, however, that the best distillate for general purposes is produced when the distillation is carried on at the temperature of about 100° and this distillate I call "fluid B." This fluid is useful for producing light and heat; but when used to saturate air to form gas to be burned the burning of it under high temperatures is liable to produce smoke and under low temperatures condensation. To make a still further improved burning-fluid, I add to every four parts of the substance B one part of a compound which I call "fluid C," and which is composed of the substances and in the proportions following—that is, about one gallon of highly-rectified coal-naphtha or of benzole, one-half pound of gum-dammar, one-half pound of the oil or gum of spruce or of hemlock, and about one quart of crude wood-naphtha, and which is made by first dissolving the gums and oils in the coal-naphtha or in the benzole and then adding the wood-naphtha. The substance produced by this compounding fluid B and fluid C, I call "fluid D." When B and C are mixed together to form D, as described, I recommend the mixing with them of a weak solution of hot lime-water, and then allowing the mixture to stand for a time, (the longer the better,) and then decanting off the clear liquid. I find that by adding to the compound A, after it is prepared for the still, a peculiar kind of earth, known as "India" clay, in the proportion of about twenty-five pounds of the clay to every twenty-seven gallons of the compound, and then distilling the whole mixture, as aforesaid, I largely increase the product B without materially enhancing its cost.

Although in the foregoing description I have specified specific ingredients and given proportions which I prefer, I claim the right to vary them so long as I keep within the substance of my invention, and I will further mention that I can omit the coal-tar, the wood-tar, and the crude turpentine, or either of them, and yet make a good and cheap burning-fluid, as above described, without them, but not as cheaply as by their use, and whether these substances be used or omitted in the above-described manufacture it will still be within the principle and substance of my invention.

Having now described the means and manner of producing my burning-fluids I will next explain their uses.

Fluid A, I employ to mix with the other substances, as above described. The fluids designated as "B, "C," and "D" are to be used in connection with either hydrogen, carbureted hydrogen, or atmospheric air to produce a combustible fluid to be burned in jets like gas. This is to be done by passing either the hydrogen, carbureted hydrogen, or atmospheric air in any known way and by any known means over the surface of the fluids B, C, or D, whereby the air takes up or becomes charged with a substance from the fluid which renders it capable of being burned like gas and gives it highly-illuminating qualities. In practical operation, and for the sake of economy, I prefer the use of atmospheric air, instead of hydrogen or carbureted hydrogen.

By this invention of mine I provice the cheapest light for its quality that I know of.

What I claim as my invention, and desire to secure by Letters Patent, is—

The burning-fluids A, C, and D, formed in the manner and of the materials substantially as and for the purpose set forth.

JONATHAN GRIFFIN.

In presence of—
 MILES B. ANDRUS,
 MELVILLE V. BIGGS.